(12) United States Patent
Lange et al.

(10) Patent No.: US 7,986,222 B2
(45) Date of Patent: Jul. 26, 2011

(54) TIRE POSITION IDENTIFICATION SYSTEM AND METHOD

(75) Inventors: Thomas Lange, Unterhaching (DE); Thomas LeMense, Farmington, MI (US); Walter Schuchter, Graz (AT)

(73) Assignee: Infineon Technologies AG, Neubiberg (DE)

( * ) Notice: Subject to any disclaimer, the term of this patent is extended or adjusted under 35 U.S.C. 154(b) by 324 days.

(21) Appl. No.: 12/391,441

(22) Filed: Feb. 24, 2009

(65) Prior Publication Data

US 2010/0214088 A1 Aug. 26, 2010

(51) Int. Cl.
*B60C 23/00* (2006.01)

(52) U.S. Cl. .......................... 340/442; 340/447; 73/146

(58) Field of Classification Search .................. 340/442, 340/445, 447, 426.33; 73/146, 146.2, 146.4, 73/146.5
See application file for complete search history.

(56) References Cited

U.S. PATENT DOCUMENTS

| | | | |
|---|---|---|---|
| 5,880,363 A | 3/1999 | Meyer et al. | |
| 6,018,993 A | 2/2000 | Normann et al. | |
| 6,489,888 B1 | 12/2002 | Honeck et al. | |
| 6,788,193 B2 | 9/2004 | King et al. | |
| 6,882,270 B2 * | 4/2005 | Stewart et al. | 340/442 |
| 6,885,293 B2 | 4/2005 | Okumura | |
| 7,010,968 B2 * | 3/2006 | Stewart et al. | 73/146 |
| 7,202,777 B2 | 4/2007 | Tsuji et al. | |
| 7,327,233 B2 | 2/2008 | Gerardiere | |
| 7,369,043 B2 | 5/2008 | McQuade | |
| 7,385,485 B2 | 6/2008 | Thomas et al. | |
| 7,411,488 B2 | 8/2008 | Watabe et al. | |
| 7,414,523 B2 | 8/2008 | Li et al. | |
| 7,425,892 B2 | 9/2008 | Mori et al. | |

* cited by examiner

*Primary Examiner* — Toan N Pham

(74) *Attorney, Agent, or Firm* — Dicke, Billig, Czaja, P.L.L.C.

(57) ABSTRACT

A tire position identification system and method include a transmitter that is configured to send an initiation signal. A receiver is configured to receive the initiation signal and attenuate the initiation signal until the initiation signal is within a first predetermined range of a reference signal. A controller identifies the position of a tire in response to the attenuation. In some embodiments, the reference signal is adjusted until the attenuated initiation signal is within a second predetermined range of the adjusted reference signal, and the position of the tire is identified further in response to the amount of adjustment of the reference signal.

22 Claims, 5 Drawing Sheets

TIRE POSITION IDENTIFICATION SYSTEM AND METHOD

BACKGROUND

Many different types of sensor devices exist for providing information about the tires of a wheeled vehicle. For example, maintaining recommended tire pressure is important to insure proper tire tread wear and safe vehicle operation. Moreover, features such as automatic stability and traction control in cars have made it necessary to obtain information about the vehicle's tires and the interaction between the tires and the road surface. Sensors for providing such information typically are mounted to each of the vehicle's tires, and the information from the tire-mounted sensors can then be transmitted to a computer system situated in the vehicle, for example.

It is also desirable to associate the information being provided by the sensors with the particular tire to which the sensor is mounted. In other words, it is more useful to notify the driver of the vehicle that the right-front tire pressure is low, for example, rather than simply providing an indication that the pressure of one of the tires is low.

In typical systems, the tire sensor transmits an identifier, such as a serial number, along with the detected tire parameters. The vehicle's computer can then compare the identifier received from the tire with serial numbers stored in its memory to verify that the particular tire is mounted to that vehicle (as opposed to another vehicle parked nearby, for example) and correlate the serial number with an associated tire location stored in the memory. However, if the position of the tire is changed due to routine tire rotation, replacing a damaged tire, etc., the location information needs to be updated in the vehicle's computer.

SUMMARY

In accordance with embodiments of the invention, a tire position identification system includes a transmitter that is configured to send an initiation signal. A receiver is configured to receive the initiation signal and attenuate the initiation signal until the initiation signal is within a first predetermined range of a reference signal. A controller identifies the position of a tire in response to the attenuation. In some embodiments, the reference signal is adjusted until the attenuated initiation signal is within a second predetermined range of the adjusted reference signal, and the position of the tire is identified further in response to the amount of adjustment of the reference signal.

BRIEF DESCRIPTION OF THE DRAWINGS

Embodiments of the invention are better understood with reference to the following drawings. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. Regarding embodiments disclosed, the term "exemplary" is merely meant as an example, rather than the best or optimal. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. In addition, while a particular feature or aspect of an embodiment may have been disclosed with respect to only one of several implementations, such feature or aspect may be combined with one or more other features or aspects of the other implementations as may be desired and advantageous for any given or particular application. The following detailed description, therefore, is not to be taken in a limiting sense, and the scope of the present invention is defined by the appended claims.

Figure 1:
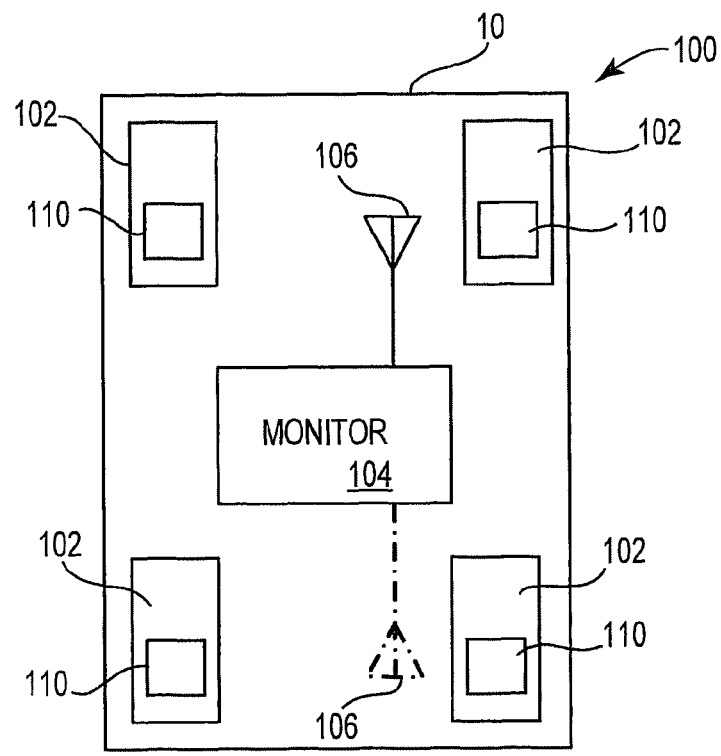
FIG. 1 is a block diagram conceptually illustrating portions of a tire system in accordance with disclosed embodiments.

Many different types of wheeled vehicles use pneumatic tires (in this specification, the term tire generally refers to a pneumatic tire). Typically, a tire is mounted on the rim of a vehicle wheel and is in contact with a surface upon which the vehicle travels, such as a road surface. FIG. 1 conceptually illustrates a tire system 100 as it is implemented with a vehicle 10, such as a car or truck. The vehicle 10 has a plurality of tires 102 mounted to the vehicle 10 in a conventional manner, and each tire 102 has a sensor system 110 mounted to the tire. Typically, the sensor 110 is mounted inside the tire, and is configured to measure parameters of the respective tire such as air pressure and temperature.

The sensor system 110 outputs signals representing the measured parameters of the tire 102, such as information about the tire pressure, temperature, sidewall deflection, etc. The sensor 110 sends the tire information to a monitoring device 104 that is mounted to the vehicle 10. Information can be transmitted from the sensor system 110 to the monitoring device 104 in any suitable manner, such as modulating the information onto an RF signal.

The system 100 is configured such that the monitor 104 can associate the received information with the specific tire 102 that sent the information. Each tire 102 is assigned an identifier, such as a serial number. The monitoring device 104 stores each of tire identifiers, so that when data are received from the sensors 110, the monitoring device knows that the information received is from a tire associated with that vehicle, rather than another vehicle.

In the illustrated embodiment, the monitoring device 104 is configured to query the sensors 110 when tire information is to be sent from the sensors 110 to the monitoring device 104. In certain embodiments, this is accomplished by sending an initiation signal to the sensor 110. Typically, the initiation signal is a low frequency (LF) signal that is transmitted using one or more antennas 106.

In response to the initiation signal, the sensor 110 transmits its identifier, the detected tire information such as tire pressure, and the received signal strength of the received LF initiation signal. The received signal strength is used to determine the tire location. For example, if a single antenna 106 is used, it is placed such that the distance between the antenna 106 and each of the tire-mounted sensors 110 is different. Thus, the strength of the LF signal received at each of the sensors 110 will vary according to its distance from the antenna 106.

In some embodiments, two antennas 106 are employed for transmitting the LF initiation signal. For example, one antenna 106 is located near the vehicle's front axle, and a second antenna 106 is located near the rear axle, with the antennas located closer to one side of the vehicle than the other. The monitoring system 104 can then query either the front or rear tires by transmitting the LF initiation signal from the corresponding front or rear antenna, and identify the left and right sides based on the signal strength received by the respective sensors 110.

Figure 2:
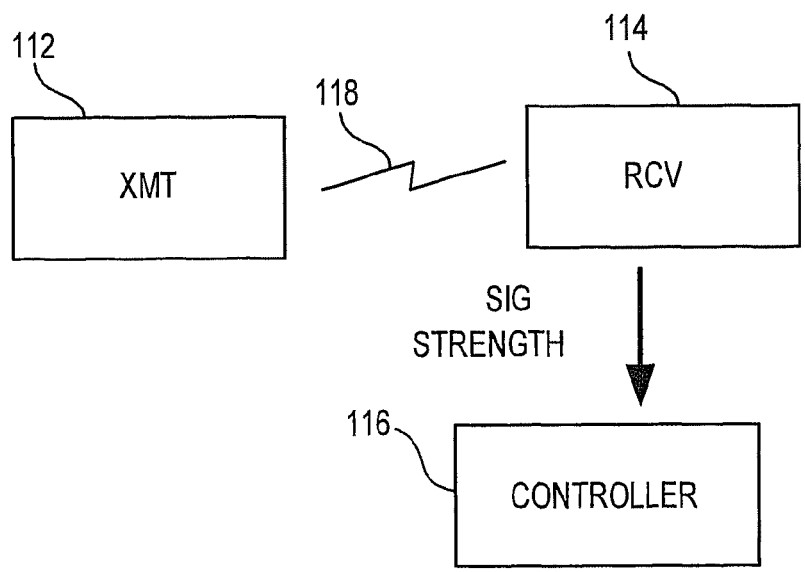
FIG. 2 is a block diagram conceptually illustrating further aspects of an embodiment of a tire system.

FIG. 2 illustrates further aspects of an embodiment of the tire system 100. A transmitter 112 is configured to send the initiation signal 118, and a receiver 114 is configured to receive the initiation signal 118 and determine the received signal strength, which as noted above, is used to identify the location of the tire. The signal strength indication is output to a controller 116, which is configured to identify the tire location based on the signal strength. Typically, the receiver 114 for receiving the initiation signal 118 is mounted with the sensor 110 in a tire 102 and powered by a battery. (Other embodiments are envisioned where the receiver 114 is incorporated with the monitoring system 104 or otherwise mounted to the vehicle itself). Thus, a small, low-power solution is desirable. However, known received signal strength indicator (RSSI) devices tend to be complicated, consuming significant die space and power.

Figure 3:
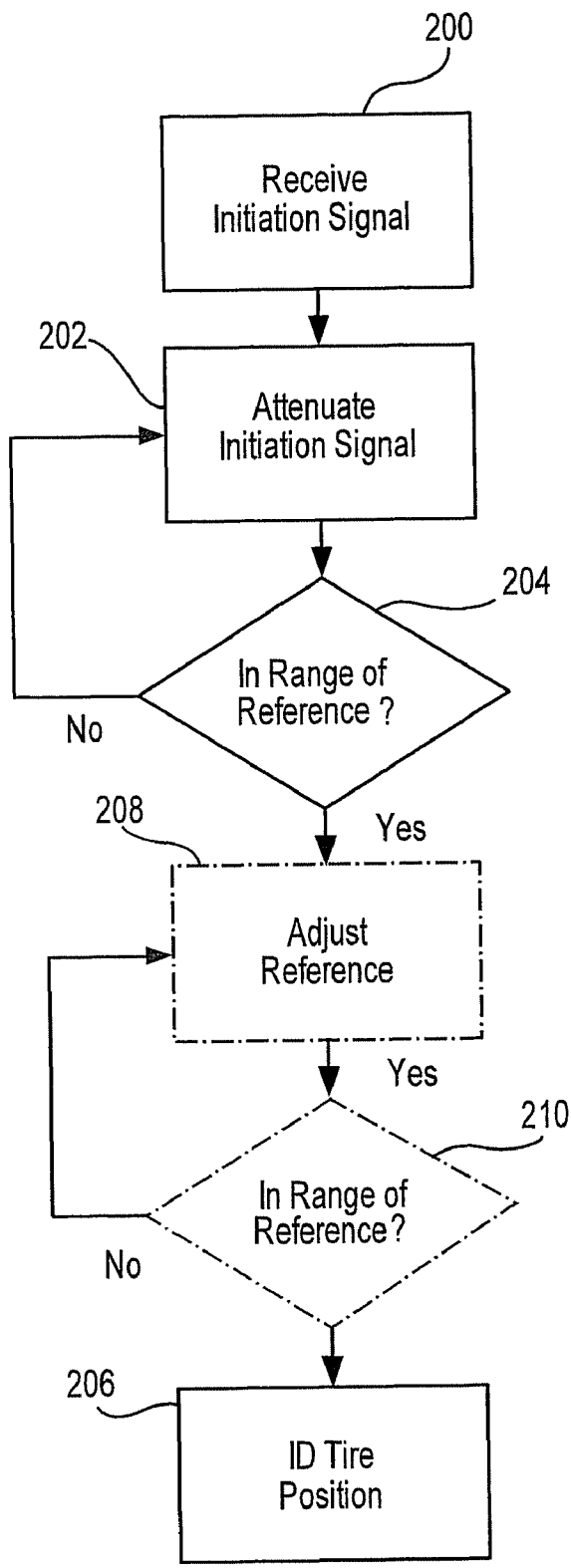
FIG. 3 is a flow diagram illustrating an embodiment of a method for identifying tire location.

FIG. 3 is a flow diagram generally illustrating a method for identifying tire location in accordance with disclosed embodiments. The receiver 114 is configured to attenuate the initiation signal 118 until the initiation signal 118 is within a first predetermined range of a reference signal. Thus, in block 200, the initiation signal 118 is received, and in block 202 the signal is attenuated. The attenuated signal is compared to a reference signal in block 204, and the attenuation continues until the signal is within a predetermined range of the reference signal. The amount of attenuation required to bring the received attenuation signal near the reference signal provides an indication of the received signal strength. This signal strength indication can be used to identify the tire position, for example, when used in conjunction with information received from other tires. Accordingly, the controller 116 is configured to identify the position of a tire in response to the attenuation in block 206.

In some embodiments, when the attenuated initiation signal is within the predetermined range of the reference signal as determined in block 204, the controller 116 adjusts the level of the reference signal as illustrated in block 208 until the attenuated initiation signal is within a predetermined range of the adjusted reference signal as determined in block 210. The attenuation of block 202 provides a first, or "rough" indication of the received signal strength, then the reference signal is adjusted to "fine tune" the received signal strength indication in block 208. In such embodiments, the identification of the tire position in block 206 is based on both the initial attenuation and the adjustment of the reference signal.

Figure 4:
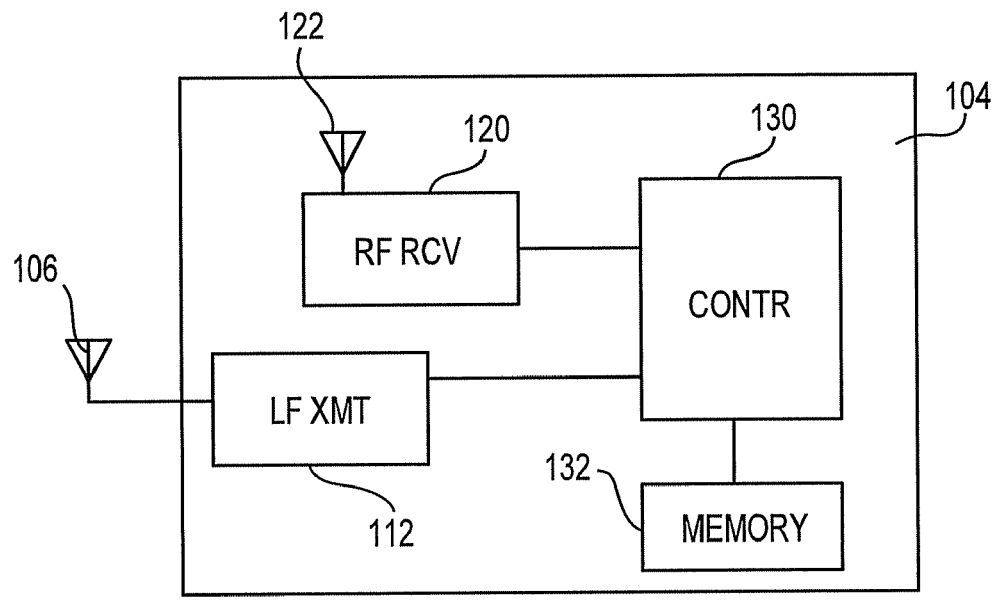
FIG. 4 is a block diagram conceptually illustrating an embodiment of a tire monitoring system.

FIG. 4 illustrates portions of an embodiment of the monitoring system 104. An RF receiver circuit 120 is connected to an RF antenna 122 for receiving data from the tire sensors 110. The receiver circuit 120 demodulates the RF signal received by the RF antenna 122 to obtain the measured tire data. A controller 130, which could be implemented by any suitable programmable device such as a digital signal processor (DSP), microcontroller, microprocessor, etc., is programmed to control operations of the monitoring system 104. A memory 132 is accessible by the controller 130 and stores, among other things, a vehicle identification code that identifies the specific vehicle to differentiate the vehicle from other vehicles, and a sensor identification code that identifies the particular sensor 110 installed in each of the tires to differentiate one sensor 110 from others.

The transmitter 112, which is an LF transmitter in the illustrated embodiment, is coupled to the LF antenna 106, and is controlled by the controller 130 to send the initiation signals to the sensors 110 at the appropriate times. The controller 130 receives the tire data from the receiver circuit 120, including the indication of the received initiation signal strength, and correlates the data with the tire identifier information stored in the memory 132 to provide an output signal that can be used to display tire information to a vehicle operator including the tire position.

Figure 5:
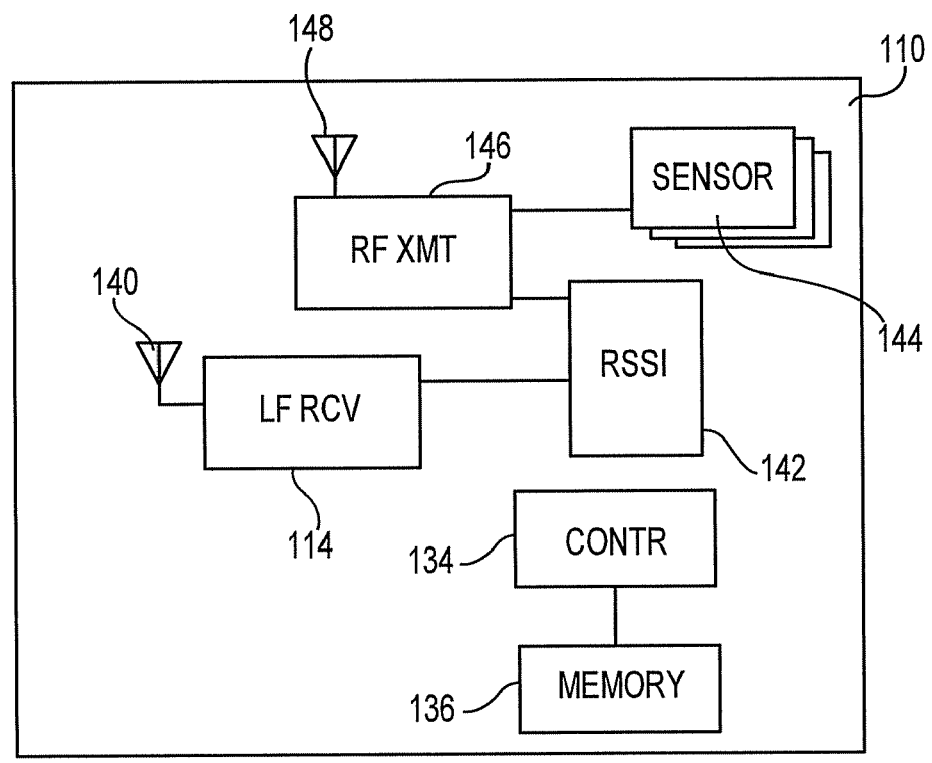
FIG. 5 is a block diagram conceptually illustrating an embodiment of a tire sensor system 110.

FIG. 5 conceptually illustrates portions of an embodiment of the sensor system 110. Typically, a controller 134 orchestrates operation of the system 110 based on program instructions which may be stored an associated memory 136. The receiver 114, which is an LF receiver in the illustrated embodiment, is coupled to an LF antenna 140 for receiving the initiation signal 118 from the transmitter 112. The received LF signal is input to a received signal strength indicator (RSSI) 142, which attenuates the received signal as described above to provide an indication of the received signal strength. One or more sensors 144 are configured to measure various tire parameters, such as tire pressure and temperature. The output of the sensor(s) 144 and the signal strength information are input to an RF transmitter 146, which sends the tire information and signal strength information to the monitor system 104 via an RF antenna 148.

Figure 6:
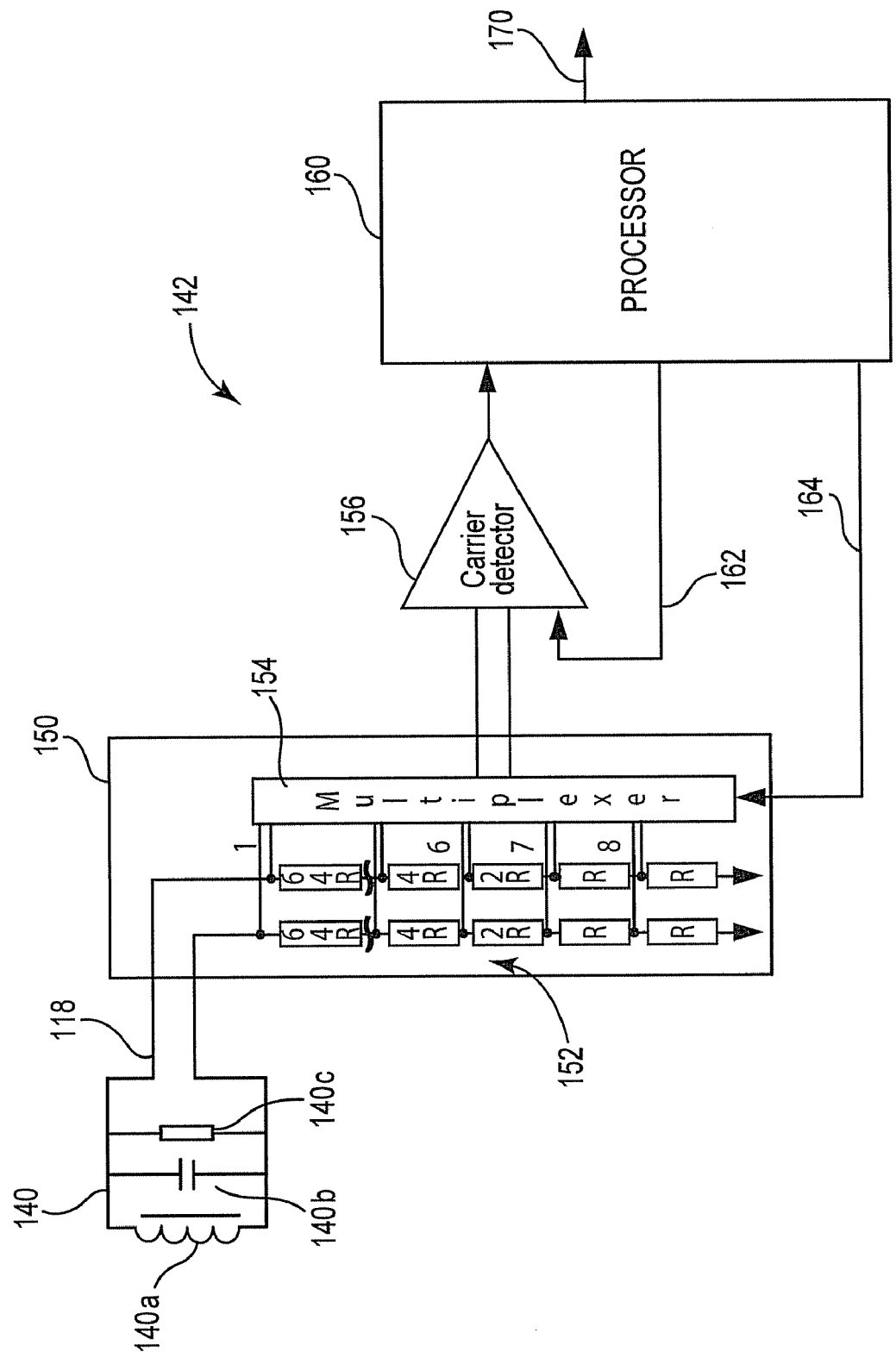
FIG. 6 is a block diagram conceptually illustrating an embodiment of a received signal strength indicator.

FIG. 6 illustrates portions of an embodiment of the RSSI 142. The LF receiving antenna 140 includes a parallel-connected inductor 140a, capacitor 140b and resistor 140c that provides a differential signal to an attenuator 150. In certain embodiments, the LF initiation signal 118 is a 125 kHz signal. In the illustrated embodiment, the attenuator 150 is a digital resistive attenuator with an attenuation range of 0-42 dB with 6 dB attenuation increments, or steps. In other embodiments, other suitable antenna networks that are capable of converting incoming electromagnetic energy into a voltage are employed.

A network of resistors 152 are connected to a multiplexer 154. The received LF initiation signal 118 is applied to the resistor network 152 to reduce the incoming signal. Resistors use relatively little silicon area, and the relative values of resistors formed in silicon can be determined very accurately. Thus, the digital, or step attenuator 152 is simpler and more accurate than a typical continuous analog attenuator. Moreover, such analog attenuators can be unstable over varying temperature and voltage conditions, and they may require more supply current than would be available in many low power application tire applications.

Basically, the received initiation signal 118 is attenuated, or reduced, in predetermined increments and compared to a predetermined reference. The attenuated initiation signal is output to a comparator 156 to compare the attenuated signal to the reference signal. In some embodiments, the comparator 156 is a carrier detector, which simply outputs a digital signal indicating whether the input signal is over or under the reference value. An appropriately programmed processor 160 receives the output of the comparator 156, and provides the reference signal 162 that is input to the comparator 156. The processor 160 also outputs a control signal 164 to the multiplexer 154, which functions to control the inputs to the multiplexer and vary the attenuation of the initiation signal 118.

Once the initiation signal 118 has been attenuated such that it is within a predetermined range of the reference signal 162, the processor 160 adjusts the reference signal 162 to provide a more precise indication of signal strength. In some embodiments, this involves adjusting the reference signal 162 in predefined increments. When the reference signal 162 has been adjusted such that it is within a second predetermined range of the attenuated initiation signal, an output signal 170 providing an indication of the determined signal strength is provided to the RF transmitter 146 and sent to the monitoring device 104. In some embodiments, the output signal 170 indicates the number of attenuation increments or steps, and the number of reference signal adjustment increments. The controller 130 identifies the tire position based on the signal strength as determined by the attenuation process.

Figure 7:
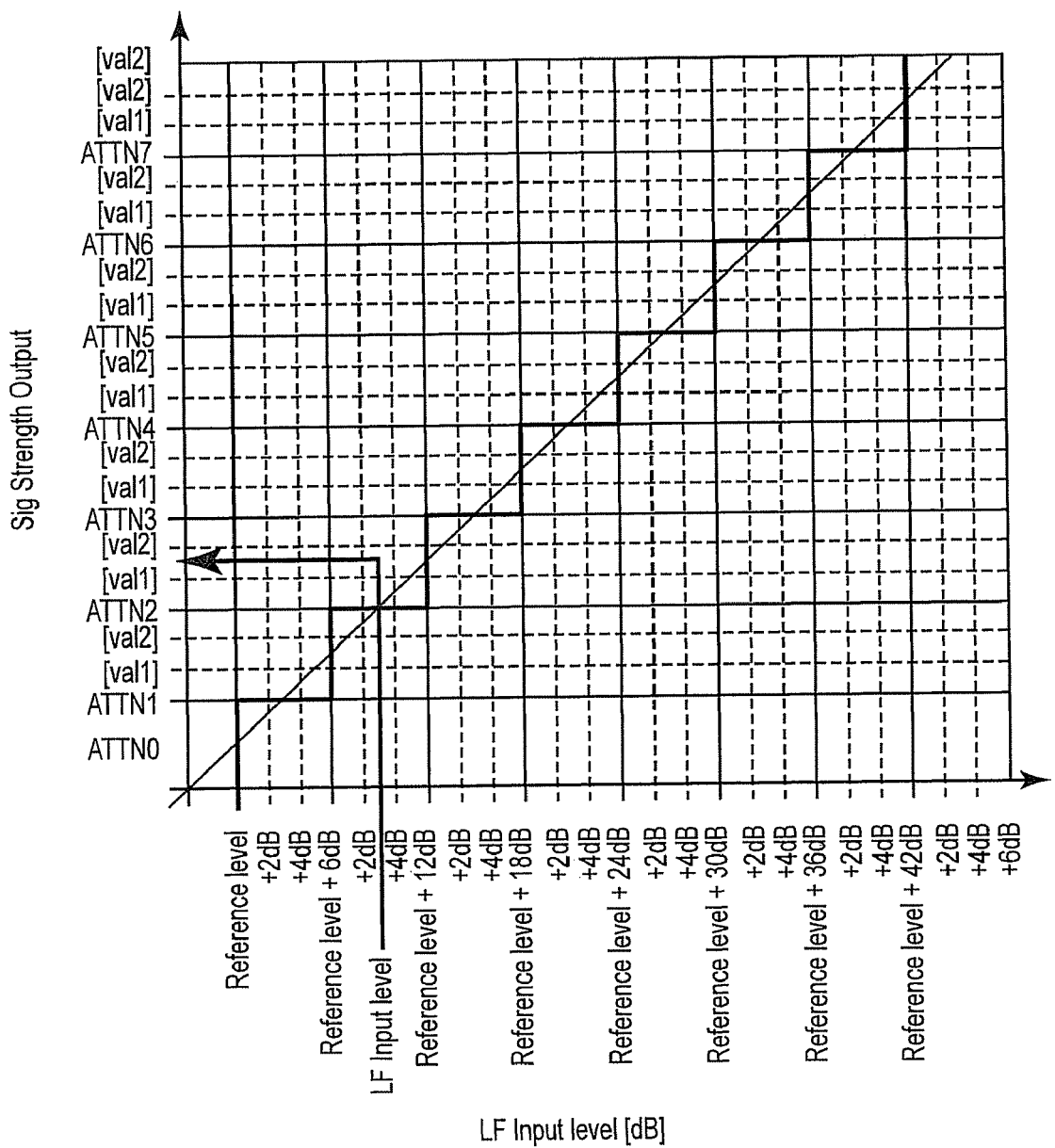
FIG. 7 is a chart illustrating an example of a method for determining a received signal strength.

Any suitable approximation algorithm can be used to control the multiplexer 154, and thus the amount of attenuation. FIG. 7 is a chart illustrating an example of the step attenuation in accordance with some embodiments. In the illustrated example, the resistor network 152 is configured such that the attenuator 150 has an attenuation range of 0-42 dB with 6 dB attenuation steps. Thus, there are eight taps, or attenuation steps that are selected by the control signal 164 input to the multiplexer 154. The horizontal axis in FIG. 7 thus includes the reference signal 162 and seven 6 dB increments of the reference signal (Reference level+6 dB, Reference level+12 dB, etc.), based on the attenuation steps of the resistor network 152. The vertical axis includes eight corresponding attenuation steps, ATTN0-ATTN7. Additionally, the processor 160 is configured to selectively adjust the reference signal 164 in increments of 2 dB, effectively resulting in a 2 dB resolution for the RSSI 142. The vertical axis therefore also includes sub-steps Val1 and Val2 between each of the attenuation steps ATTN0-ATTN7.

The example illustrated in FIG. 7 assumes the initiation signal 118 has a received level of the reference signal plus about 8 dB. The approximation algorithm employed in the example sets the first attenuation at the midpoint of the attenuation range. Thus, the control signal 164 is set to the fourth level of attenuation ATTN4, which corresponds to the reference level plus 18 dB. The output of the comparator 156 is read, and since the received initiation signal is less than that value, the comparator 156 output is 0. The control signal 164 is then set to ATTN2, which corresponds to the reference level plus 6 dB. As illustrated in FIG. 7, the received signal is greater than this value, so the carrier detect 156 will detect the signal and its output will be 1. In response to this output of the carrier detect, the control signal 164 is set at ATTN3. Since the input signal 118 is less than the corresponding level, the carrier detect output will be 0, indicating the attenuated signal level is within the preselected range (6 dB) of the reference signal 162.

In the particular embodiment illustrated, the reference signal 162 is then adjusted in 2 dB increments. Thus, the reference signal 162 is increased by 2 dB (val1), and the input signal 118 attenuated at the ATTN2 step is compared to the increased reference signal. The carrier detect 156 will detect the attenuated signal, resulting in an output of 1. Accordingly, the reference signal 162 is increased by 4 dB (val2) and compared to the attenuated input signal, resulting in an output of 0 from the carrier detect 156 and indicating that the attenuated input signal 118 is within the preselected 2 dB range of the adjusted reference signal. Thus, the output signal 170 indicates the ATTN2 attenuation level and the val1 adjustment of the reference signal, which corresponds to a received signal strength of the reference signal 162 plus 8 dB.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A tire position identification system, comprising:
a transmitter configured to send an initiation signal;
a receiver configured to receive the initiation signal and attenuate the initiation signal until the initiation signal is within a first predetermined range of a reference signal; and
a controller configured to identify the position of a tire in response to the attenuation.

2. The system of claim 1, wherein the receiver is further configured to:
adjust the reference signal until the attenuated initiation signal is within a second predetermined range of the adjusted reference signal; and
identify the position of the tire in response to the amount of adjustment of the reference signal.

3. The system of claim 1, further comprising:
a sensor configured to measure parameters of the tire;
wherein the sensor and the receiver are adapted for mounting to the tire.

4. The system of claim 1, wherein:
the receiver includes a resistor network that receives the initiation signal.

5. The system of claim 1, wherein:
the initiation signal is a low frequency signal.

6. A tire system, comprising:
a tire; and
a sensor system mounted to the tire, the sensor system including a receiver configured to receive the initiation signal and attenuate the initiation signal until the initiation signal is within a first predetermined range of a reference signal.

7. The system of claim 6, further comprising:
a controller configured to identify the position of the tire in response to the attenuation.

8. The system of claim 6, further comprising:
a transmitter configured to send the initiation signal.

9. The system of claim 6, further comprising:
a vehicle;
wherein the tire is mounted to the vehicle.

10. The system of claim 9, wherein:
a plurality of the tires are mounted to the vehicle,
a plurality of the sensor systems, and
each sensor system is mounted to a respective tire.

11. The system of claim 6, wherein the receiver is further configured to:
adjust the reference signal until the attenuated initiation signal is within a second predetermined range of the adjusted reference signal; and
identify the position of the tire in response to the amount of adjustment of the reference signal.

12. The system of claim 6, wherein:
the receiver includes a resistor network that receives the initiation signal.

13. The system of claim 6, wherein:
the initiation signal is a low frequency signal.

14. A method of determining tire position, comprising:
receiving an initiation signal;
attenuating the received initiation signal until the initiation signal is within a first predetermined range of a reference signal; and
identifying the position of the tire in response to the amount of attenuation of the initiation signal.

15. The method of claim 14, further comprising:
when the attenuated initiation signal is within the first predetermined range of the reference signal, adjusting the reference signal until the attenuated initiation signal is within a second predetermined range of the adjusted reference signal; and
identifying the position of the tire in response to the amount of adjustment of the reference signal.

16. The method of claim 15, wherein:
the reference signal is adjusted in predetermined increments; and
the position of the tire is identified in response to the number of predetermined increments.

17. The method of claim 14, wherein:
the initiation signal is received by a sensor mounted to the tire.

18. The method of claim 17, further comprising:
transmitting the initiation signal from a transmitter mounted to a vehicle associated with the tire.

19. The method of claim 18, wherein:
the initiation signal is received by a plurality of sensors mounted to a corresponding plurality of tires.

20. The method of claim 18, wherein:
transmitting the initiation signal includes transmitting a low frequency signal.

21. The method of claim 14, wherein:
the initiation signal is attenuated in predetermined increments; and
the position of the tire is identified in response to the number of predetermined increments.

22. The method of claim 14, wherein:
attenuating the initiation signal includes applying the initiation signal to a resistor network.

* * * * *